(12) United States Patent
Jurgens et al.

(10) Patent No.: US 8,641,870 B2
(45) Date of Patent: Feb. 4, 2014

(54) METHOD FOR SURFACE TREATMENT OF A TITANIUM DIOXIDE PIGMENT

(75) Inventors: Volker Jurgens, Kirchhundem (DE); Janine Siekman, Bergisch Gladbach (DE); Siegfried Blumel, Ratingen (DE); Alexander Breyder, Leverkusen (DE); Volker Schmitt, Leichlingen (DE)

(73) Assignee: Kronos International, Inc., Leverkusen (DE)

( * ) Notice: Subject to any disclaimer, the term of this patent is extended or adjusted under 35 U.S.C. 154(b) by 0 days.

(21) Appl. No.: 13/429,512

(22) Filed: Mar. 26, 2012

(65) Prior Publication Data

US 2012/0247702 A1    Oct. 4, 2012

(30) Foreign Application Priority Data

Apr. 1, 2011  (DE) .................. 10 2011 015 856

(51) Int. Cl.
*D21H 11/00*  (2006.01)
(52) U.S. Cl.
USPC .................. 162/181.5; 106/442; 428/403
(58) Field of Classification Search
USPC ............... 106/442, 443, 444; 428/403, 404; 162/181.5
See application file for complete search history.

(56) References Cited

U.S. PATENT DOCUMENTS

| | | | |
|---|---|---|---|
| 5,114,486 A | 5/1992 | Demosthenous et al. | |
| 5,785,748 A | 7/1998 | Banford et al. | |
| 7,147,702 B2 * | 12/2006 | Drews-Nicolai et al. | ..... 106/443 |
| 2007/0068423 A1 | 3/2007 | Thiele | |
| 2007/0175363 A1 | 8/2007 | Blumel et al. | |

FOREIGN PATENT DOCUMENTS

| | | |
|---|---|---|
| DE | 103 32 650 A1 | 2/2005 |
| DE | 20031032650 | 2/2005 |
| DE | 102006045244 | 5/2007 |
| EP | 0753546 | 1/1997 |
| WO | WO2004/061013 | 7/2004 |

* cited by examiner

*Primary Examiner* — Mark Halpern
(74) *Attorney, Agent, or Firm* — Locke Lord LLP

(57) ABSTRACT

The invention relates to a method for the surface treatment of a titanium dioxide with aluminum phosphate and hydrous aluminum oxide that leads to pigments with improved greying resistance, while simultaneously maintaining good brightness and opacity. The method is characterized in that phosphoric acid is initially added to a $TiO_2$ suspension with a pH value of at least 8, in which context the pH value drops to 3 or below. An alkaline aluminum compound is subsequently added, in which context the pH rises to at least 5, after which an acid aluminum compound is added, as a result of which a pH value of 4.5 to 7 is obtained. The pigment manufactured by the method according to the invention is eminently suitable for use in decorative laminating paper.

22 Claims, No Drawings

METHOD FOR SURFACE TREATMENT OF A TITANIUM DIOXIDE PIGMENT

RELATED APPLICATIONS

This application claims the benefit of U.S. Provisional Patent Application Ser. No. 61/471,918 filed Apr. 5, 2011, and entitled "Method for Surface Treatment of a Titanium Dioxide Pigment" and the benefit of DE 102011015856.1 filed Apr. 1, 2011.

TECHNICAL FIELD OF THE INVENTION

The invention relates to a method for the surface treatment of a titanium dioxide pigment, a titanium dioxide pigment with high light-fastness (greying resistance) and its use in the production of decorative laminating paper.

BACKGROUND OF THE INVENTION

Decorative laminating paper forms part of a decorative, thermosetting coating material, used with preference for finishing furniture surfaces and for laminate flooring. Laminates is the term used to denote materials in which, for example, several impregnated, stacked layers of paper, or paper and hardboard or fibreboard, are pressed together. The use of special synthetic resins achieves extraordinarily high resistance of the laminates to marring, impact, chemicals and heat.

The use of special-purpose papers (decorative laminating papers) permits the production of decorative surfaces, where the decorative laminating paper serves not only as facing paper, e.g. to hide unattractive wood material surfaces, but also as a carrier for the synthetic resin.

The demands imposed on decorative laminating paper include, among others, opacity (hiding power), light-fastness (greying resistance), colour-fastness, wet strength, suitability for impregnation and printability.

In principle, a pigment based on titanium dioxide is eminently suitable for achieving the necessary opacity of the decorative laminating paper. During paper manufacture, a titanium dioxide pigment, or a titanium dioxide pigment suspension, is usually mixed with a pulp suspension. In addition to pigment and pulp as the feedstock, use is generally also made of auxiliaries, such as wet-strength agents, and further additives, such as certain fillers, where appropriate. The interactions of the individual components (pulp, pigment, auxiliaries and additives, water) with each other contribute to formation of the paper and determine the retention of the pigment. Retention is the capacity for retaining all inorganic substances in the paper during production.

A number of titanium dioxide pigments exist for use in decorative laminating paper. Their key properties include not only good brightness and opacity, but also light-fastness.

Titanium is generally known to be photochemically active. A decorative laminating paper pigmented with titanium dioxide displays increasing greying when exposed to UV radiation in the presence of moisture and oxygen. Light-fastness is primarily taken to mean the resistance of laminates to greying when exposed to UV radiation.

To improve the light-fastness (greying resistance) of decorative laminating paper, the titanium dioxide pigment is customarily coated with aluminium compounds, particularly with aluminium phosphate.

For example, U.S. Pat. No. 5,114,486 discloses coating with zinc/aluminium phosphate in order to improve greying resistance.

U.S. Pat. No. 5,785,748 describes a method for uniform coating of titanium dioxide with aluminium phosphate, where a mixture of concentrated phosphoric acid and an aluminium compound is added to a titanium dioxide suspension, and aluminium phosphate is precipitated at a pH value of 3.5 or more.

WO 2004/061013 A2 discloses a titanium dioxide pigment with good greying resistance for use in decorative laminating paper that is provided with an aluminium phosphate coating and demonstrates particularly favourable surface properties as regards the isoelectric point and the zeta potential. The aluminium phosphate layer is precipitated at a constantly maintained pH value of 7.

In an advanced development of this method according to DE 10 2006 045 244 A1, the coated pigment is finally subjected to heat treatment.

According to DE 103 32 650 A1, it is possible to manufacture a titanium dioxide pigment with high greying resistance that simultaneously displays improved retention and opacity. The method is characterised in that an aluminium component and a phosphorus component are added to a titanium dioxide suspension at a constantly maintained pH value of at least 10, after which the pH value is reduced to below 9 in order to precipitate aluminium phosphate.

SUMMARY OF THE INVENTION

The object of the invention is to indicate a method by means of which titanium dioxide pigments with improved greying resistance and consistently high brightness and opacity, compared to the prior art, can be manufactured for use in decorative laminating papers.

The object is solved by a method for manufacturing a post-treated titanium dioxide pigment, comprising the following steps:

a) Provision of an aqueous suspension of untreated titanium dioxide particles with a pH value of at least 8, preferably at least 9, b) Addition of phosphoric acid, c) Addition of an alkaline aluminium compound, d) Addition of an acid aluminium compound.

Further advantageous versions of the method are described in the sub-claims.

Thus, the subject matter of the invention is a post-treatment method for titanium dioxide pigments that leads to pigments with improved greying resistance while maintaining consistently high brightness and opacity, as well as a pigment possessing these properties and the use of this pigment in the production of decorative laminating papers.

DESCRIPTION OF THE PREFERRED EMBODIMENTS

Here and below, the term "oxide" is to be taken to also mean the corresponding hydrous oxides or the hydrates. All data disclosed below regarding pH value, temperature, concentration in % by weight or % by volume, etc., are to be interpreted as including all values lying in the range of the respective measuring accuracy known to the person skilled in the art. When used in the context of the present patent, the term "significant quantity" or "significant content" indicates the minimum quantity of a component, upwards of which the properties of the mixture are affected in the framework of the measuring accuracy.

The invention is based on untreated titanium dioxide particles (titanium dioxide base material) manufactured by the chloride process or the sulphate process. The titanium dioxide particles are preferably aluminium-doped. Particularly suitable are aluminium-doped titanium dioxide particles manufactured by the chloride process. The level of aluminium doping is preferably in the region of 0.5 to 2.0% by weight, calculated as Al2O3.

In the method according to the invention, a layer of aluminium-phosphorus compounds, in a mixture with hydrous aluminium oxide where appropriate, is deposited on the surface of the titanium dioxide particles. The composition depends on the quantities of the aluminium and phosphorus components used, and the quantity of doped Al2O3 possibly present. For simplicity, this layer is referred to as the aluminium oxide-phosphate layer below.

The method according to the invention is based on an aqueous suspension of untreated titanium dioxide particles, where the pH value is set to at least 8, preferably to at least 9 (Step a)). In one embodiment of the method, the suspension is previously subjected to wet milling in an agitator mill, where the grinding media familiar in operational practice, such as sand or zirconium oxide, can be used. The method according to the invention is performed at a temperature of less than 80° C., preferably at 45 to 65° C., particularly at 55 to 65° C.

In a subsequent Step b), phosphoric acid (H3PO4) is added, in which context the pH value drops, preferably to 3 or less, particularly to roughly 2 or lower. The phosphoric acid preferably has a concentration of roughly 75%.

An alkaline or acid aluminium component, such as sodium aluminate or aluminium sulphate, can optionally be added to the suspension before or during addition of the phosphoric acid, where the pH value at the end of Step b) is preferably 3 or lower, particularly roughly 2 or lower.

It has emerged that, at the end of Step b), part of the aluminium has been dissolved from untreated, aluminium-doped titanium dioxide particles. For example, if the base material has an Al2O3 content of 1.4% by weight, a quantity of roughly 0.2% by weight aluminium, calculated as Al2O3, has been dissolved at the end of Step b) (at a pH value of roughly 2).

In a Step c), an alkaline aluminium component, preferably sodium aluminate, is subsequently added to the suspension. The pH value at the end of Step c) is preferably at least 5, particularly at least 7.

An acid aluminium component in subsequently added in a Step d), in which context a pH value in the range from 4.5 to 7, preferably in the range from 5 to 6, is obtained.

In a special embodiment of the method, a further aluminium oxide layer is applied to the titanium dioxide particles in a Step e), e.g. by parallel addition of sodium aluminate and aluminium sulphate at a fixed pH value of roughly 5 (so-called "fixed pH" method).

If necessary, the pH value is finally set to roughly 6 to 7 in a Step f).

The quantity of phosphoric acid used in Step b) is preferably 1.0 to 5.0% by weight, particularly 1.5 to 3.5% by weight, particularly preferably 2.0 to 3.0% by weight, calculated as P2O5 and referred to TiO2.

The total quantity of the aluminium compounds added in Steps c) and d) is preferably 2.5 to 4.0% by weight, calculated as Al2O3 and referred to TiO2. The alkaline or acid aluminium compound optionally added before or during Step b) is also to be included in this quantity.

The total quantity of the aluminium compounds added in Steps b) to e) is preferably 3.0 to 7.0% by weight, particularly 4.0 to 6.0% by weight, calculated as Al2O3 and referred to TiO2.

The post-treated TiO2 pigment is separated from the suspension by filtration methods familiar to the person skilled in the art, the resultant filter cake being washed in order to remove the soluble salts.

The method according to the invention is characterised in that the residual moisture content of the filter cake can be reduced by roughly 10%. In the known post-treatment methods (e.g. DE 103 32 650 A1), for example, the filter cake displays a residual moisture content of at least 58% by weight (Moore filtration), while the method according to the invention can be used to preferably achieve residual moisture contents of 52% by weight and less. This results in a significant economic advantage, since less water has to be evaporated in the subsequent drying step.

To improve the light-fastness of the pigment in the laminate, a nitrate-containing compound, e.g. KNO3, NaNO3, Al(NO3)3, can be added to the washed filter cake in a quantity of 0.05 to 0.5% by weight, calculated as NO3 and referred to pigment, before or during the subsequent drying step. Furthermore, to improve the flow properties, an organic compound can be added to the pigment in one of the process steps, said compound being selected from those that are customarily used in the manufacture of TiO2 pigments and familiar to the person skilled in the art, e.g. polyalcohols (trimethylolethane, trimethylolpropane, neopentyl glycol). As an alternative to addition of the nitrate-containing compounds before or during drying, substances of this kind can also be added during milling.

In an alternative embodiment of the method, the treated pigment is subjected to heat treatment at 200 to 400° C., preferably 200 to 300° C., for roughly 60 to 180 minutes.

The pigment manufactured according to the invention is preferably characterised by an aluminium content of 3.0 to 7.0% by weight, calculated as Al2O3, and a phosphate content of 1.0 to 5.0% by weight, calculated at P2O5.

Compared to the reference pigments, the pigment manufactured by the method according to the invention demonstrates improved greying resistance, while retaining equally good brightness and opacity, and is optimally suited to use in decorative laminating paper.

Moreover, compared to DE 103 32 650 A1, the pigment filter cake demonstrates lower residual moisture contents, this resulting in further economic advantages.

EXAMPLES

The invention is described below on the basis of examples, although these are not to be interpreted as a limitation of the invention.

Example 1

2.5% by weight P2O5 in the form of 75% H3PO4 was added to a wet-milled TiO2 suspension from the chloride process with a TiO2 concentration of 450 g/l, aluminium doping corresponding to 1.5% by weight Al2O3, and a pH value of 10. A pH value of roughly 2 was obtained in this context. 2.0% by weight Al2O3 was subsequently added in the form of sodium aluminate. A pH value of roughly 10 was obtained as a result. In the next step, the suspension was then set to a pH value of 5 by adding aluminium sulphate (corresponding to 1.1 to 1.2% by weight Al2O3). 2.2% by weight Al2O3 was subsequently admixed by parallel addition of aluminium sulphate and sodium aluminate solution, such that the pH value was maintained at 5 (fixed pH method). The suspension was subsequently set to a pH value of 5.5 to 7 with the help of an alkaline sodium aluminate solution.

The post-treated TiO2 suspension was filtered and then washed to remove the water-soluble salts. Following the addition of roughly 0.18% by weight NO3 in the form of NaNO3, the washed filter paste was dried in a spray drier and subsequently milled in a jet mill.

The manufactured pigment contained the following post-treatment elements, expressed in the form of their oxides: 2.2% by weight P2O5 and 5.8% by weight Al2O3, each referred to the TiO2 base material, and 0.18% by weight NO3.

Example 2

Same procedure as in Example 1, except that, instead of 2.2% by weight Al2O3, 1.0% by weight Al2O3 was admixed in the "fixed pH method" step by parallel addition of aluminium sulphate and sodium aluminate solution.

The manufactured pigment contained the following post-treatment elements, expressed in the form of their oxides: 2.3% by weight P2O5 and 4.9% by weight Al2O3, each referred to the TiO2 base material, and 0.18% by weight NO3.

Reference Example 2.0% by weight Al2O3 in the form of sodium aluminate was added to a wet-milled TiO2 suspension from the chloride process with a TiO2 concentration of 450 g/l, aluminium doping corresponding to 1.5% by weight Al2O3, and a pH value of 10. A pH value >12 was obtained in this context. 2.5% by weight P2O5 was subsequently added in the form of disodium hydrogenphosphate solution. The pH value of the suspension remained at >12. In the next step, the suspension was set to a pH value of 5 by adding aluminium sulphate (corresponding to 2.4% by weight Al2O3). 0.9% by weight Al2O3 was subsequently admixed by parallel addition of aluminium sulphate and sodium aluminate solution, such that the pH value was maintained at 5. The suspension was subsequently set to a pH value of 6.8 with the help of an alkaline sodium aluminate solution.

The post-treated TiO2 suspension was filtered and then washed to remove the water-soluble salts. Following the addition of roughly 0.18% by weight NO3 in the form of NaNO3, the washed filter paste was dried in a spray drier and subsequently milled in a jet mill.

The manufactured pigment contained the following post-treatment elements, expressed in the form of their oxides: 2.1% by weight P2O5 and 6.0% by weight Al2O3, each referred to the TiO2 base material, and 0.18% by weight NO3.

Test Methods and Test Results
Laminate Production (Laboratory Scale)

The titanium dioxide pigments manufactured in accordance with Example 1, Example 2 and the Reference example were incorporated into decorative laminating paper and subsequently tested as regards their optical properties and light-fastness in pressed laminates. To this end, the titanium dioxide pigment to be tested was incorporated into pulp, and sheets with a sheet weight of roughly 80 g/m2 and a TiO2 content by mass of roughly 30 g/m$^2$ were produced.

For assessing the optical properties of the decorative laminating papers, and thus the quality of the titanium dioxide pigment, it is important to compare decorative laminating papers with identical ash contents. This makes it necessary for the quantity of titanium dioxide pigment used for forming the sheet to be adapted, in accordance with the retention, to the required TiO2 content by mass in the paper, 30+1 g/m$^2$ in this case, or the required grammage, 80+1 g/m$^2$ in this case. In these tests, 1.65 g pulp (oven-dry) was taken as the basis for the formation of a sheet. The procedure and the auxiliaries used are familiar to the person skilled in the art.

The titanium dioxide content (ash in [%]) of a sheet was subsequently determined. The titanium dioxide content was determined by incinerating a defined weight of the produced paper in a rapid incinerator at 900° C. The TiO2 content by mass (ash in [%]) can be calculated by weighing the residue. The following formula was used as the basis for calculating the ash content: Ash content [g/m$^2$]=(Ash [%]×Grammage [g/m$^2$])/100[%].

The further processing of the paper encompassed its impregnation and pressing into laminates. The sheet to be impregnated with resin was completely immersed in a melamine resin solution, then drawn between 2 doctor blades to ensure application of a specific amount of resin and subsequently pre-condensed at 130° C. in a recirculating-air drying oven. The amount of resin applied was 110 to 140% of the weight of the sheet. The sheet had a residual moisture content of 5.7 to 6.2% by weight. The condensed sheets were combined into books with phenolic resin-impregnated core papers and white or black underlay paper.

The books for measuring the optical properties had the following structure: decorative laminating paper, white or black underlay paper, 6 sheets of core paper, white or black underlay paper, decorative laminating paper.

The books for determining the greying resistance had the following structure: decorative laminating paper, 5 sheets of core paper, white underlay paper.

The books were pressed for 300 seconds with the help of a Wickert Type 2742 laminating press at a temperature of 140° C. and a pressure of 90 bar.

Testing

The optical properties and the greying resistance of the laminates were measured using commercially available equipment (spectrophotometer, Xenotest weathering machine).

To assess the optical properties of laminates, the optical values (CIELAB L*, a*, b*) to DIN 6174 are measured with the help of the ELREPHO® 3300 colorimeter over white and black underlay paper.

The CIELAB optical value L* over white underlay paper (L*white) was used as a measure of the brightness.

The opacity is a measure of the light transmission of the paper. The following parameters were selected as a measure of the opacity of the laminates: CIELAB L*black, the brightness of the laminates measured over black underlay paper, and the opacity value L [%]=Yblack/Ywhite×100, determined from the Y-value measured over black underlay paper (Yblack) and the Y-value measured over white underlay paper (Ywhite). Both values, CIELAB L*black and L [%], are standardised to an ash content of 30.0 g/m$^2$. To assess the greying resistance (light-fastness) of the titanium dioxide pigments, or the titanium dioxide pigment blends, the corresponding laminate samples are exposed in a XENOTEST® Alpha machine. The optical values CIELAB L*, a* and b* to DIN 6174 were measured before and after exposure in the XENOTEST® Alpha for a period of 96 hours. The light source is a xenon-arc lamp with a radiation intensity of 70 W/m$^2$. The temperature in the specimen chamber of the machine is 45° C., the relative humidity being 30%. The samples are turned round during exposure. Both $\Delta L^* = L^*\text{before} - L^*\text{after}$ and $\Delta E = ((\Delta L^*)^2 + (\Delta a^*)^2 + (\Delta b^*)^2)^{1/2}$ were stated as a measure of the greying resistance.

Test Results

The Table shows the test results for laminates produced with the pigments according to the invention (Examples 1 and 2) and with a reference pigment (Reference example). It can be seen that the laminates manufactured with the pigments according to the invention display substantially higher greying resistance and very similar brightness and opacity values in comparison with a laminate containing a pigment manufactured according to the prior art.

TABLE

|  | Greying resistance | | Ash content | Opacity | | CIELAB optical value |
| --- | --- | --- | --- | --- | --- | --- |
|  | $\Delta L^*$ | $\Delta E$ | [g/m$^2$] | $L^*_{black}$ | L [%] | $L^*_{white}$ |
| Example 1 | −0.72 | 0.73 | 30.4 | 90.3 | 90.5 | 93.6 |
| Example 2 | −0.64 | 0.65 | 30.1 | 90.4 | 90.8 | 93.6 |
| Reference example | −0.92 | 0.94 | 30.6 | 90.4 | 90.7 | 93.6 |

The invention claimed is:

1. A method for manufacturing a post-treated titanium dioxide pigment, comprising:
   a) providing an aqueous suspension of untreated titanium dioxide particles with a pH value of at least 8;
   b) adding phosphoric acid to the aqueous suspension, wherein after step b) the aqueous suspension has a pH value of no more than 3;
   c) subsequently adding an alkaline aluminium compound to the aqueous suspension;
   d) subsequently adding an acid aluminium compound to the aqueous suspension.

2. The method of claim 1 wherein after step b) the aqueous suspension has a pH value of no more than 2.

3. The method of claim 1 wherein after step c) the aqueous suspension has a pH value of at least 7.

4. The method of claim 1 wherein after step c) the aqueous suspension has a pH value of at least 5.

5. The method of claim 1 wherein after step d) the aqueous suspension has a pH value of from about 4.5 to about 7.

6. The method of claim 5 wherein after step d) the aqueous suspension has a pH value of from about 5 to about 6.

7. The method of claim 1 wherein
   after step c) the aqueous suspension has a pH value of at least about 5; and
   after step d) the aqueous suspension has a pH value of from about 4.5 to about 7.

8. The method of claim 1 wherein
   in step a) the aqueous suspension has a pH value of at least 9.

9. The method of claim 1 further comprising adding an alkaline or acid aluminium compound prior to the end of step b).

10. The method of claim 9 wherein after step b) the aqueous suspension has a pH value of no more than about 2.

11. The method of claim 9 wherein the sum of the aluminium compounds added in steps b) to d), calculated as Al2O3, is from about 2.5% to about 4.0% by weight of TiO2.

12. The method of claim 1 further comprising:
   e) applying an aluminium oxide layer to the titanium dioxide particles following steps a) through d).

13. The method of claim 12 further comprising:
   separating post-treated TiO2 pigment from the aqueous suspension after steps a) through e);
   treating the separated post-treated TiO2 pigment with sufficient nitrate to create a finished pigment having a nitrate content, measured as NO3, of up to 0.5% by weight of TiO2; and
   wherein the finished pigment has improved light-fastness compared to untreated TiO2.

14. The method of claim 12 wherein aluminium oxide layer is applied by adding in parallel sodium aluminate and aluminium sulphate to the aqueous suspension at a fixed pH value of about 5.

15. The method of claim 12 wherein the sum of the aluminium compounds added in steps b) to e), calculated as Al2O3, is from about 3.0% to about 7.0% by weight of TiO2.

16. The method of claim 15 wherein the sum of the aluminium compounds, calculated as Al2O3, is from about 3.0% to about 6.0% by weight of TiO2.

17. The method of claim 15 wherein:
   after step c) the aqueous suspension has a pH value of at least about 5; and
   after step d) the aqueous suspension has a pH value of from about 4.5 to about 7.

18. The method of claim 15 wherein the phosphoric acid, calculated as P2O5, is added in an amount of from about 1.0% to about 5.0% by weight of TiO2.

19. The method of claim 18 wherein the phosphoric acid, calculated as P2O5, is added in an amount of from about 1.5% to about 3.5% by weight of TiO2.

20. The method of claim 18 wherein the phosphoric acid, calculated as P2O5, is added in an amount of from about 2.0% to about 3.0% by weight of TiO2.

21. The method of claim 1 wherein the phosphoric acid, calculated as P2O5, is added in an amount of from about 1.0% to about 5.0% by weight of TiO2.

22. The method of claim 1 wherein the sum of the aluminium compounds added in steps b) to d), calculated as Al2O3, is from about 2.5% to about 4.0% by weight of TiO2.

* * * * *